Feb. 20, 1934.   J. G. SWAIN   1,948,320
WHEEL ASSEMBLY
Filed Jan. 11, 1933   3 Sheets-Sheet 1

Inventor
Joseph G Swain

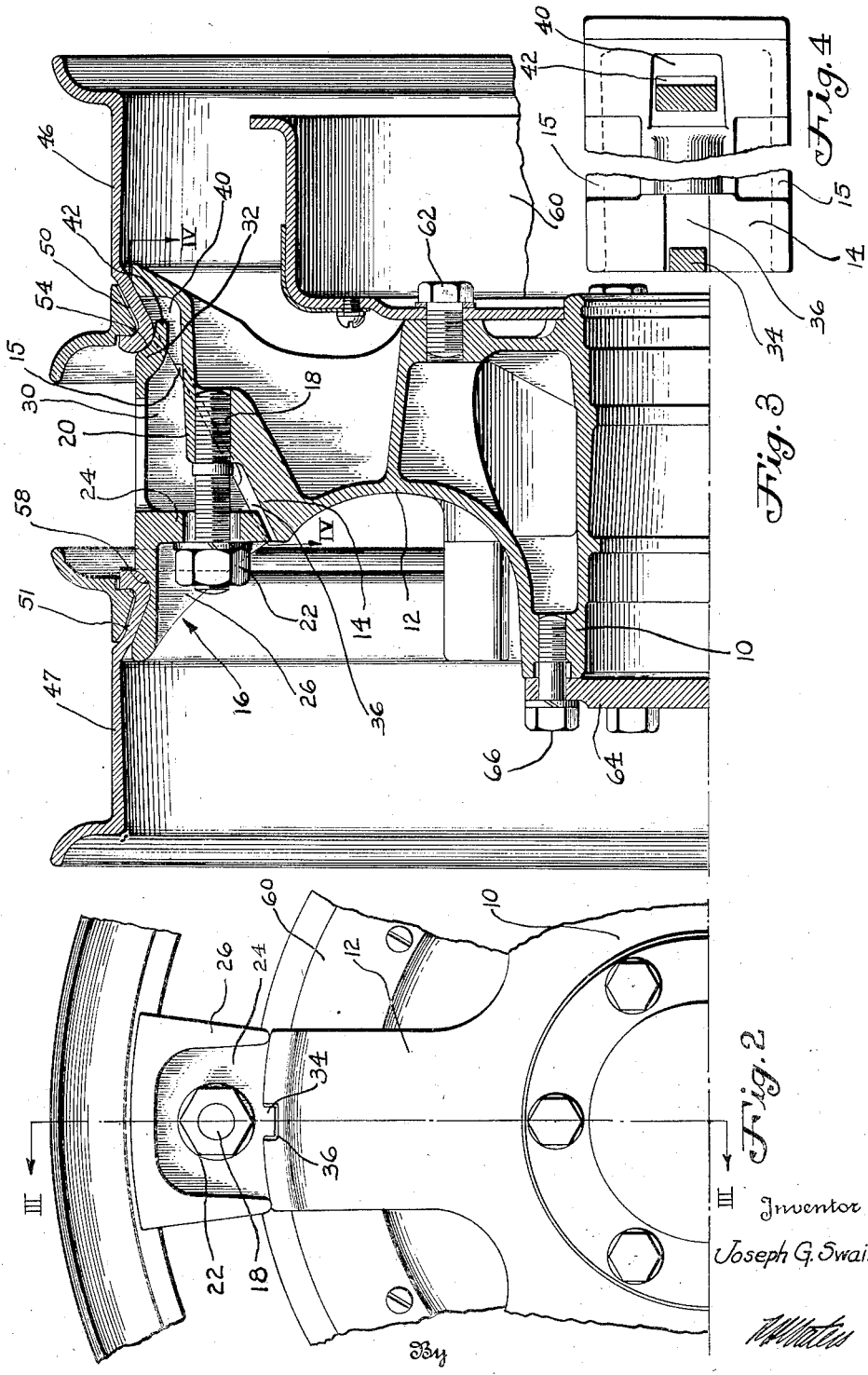

Feb. 20, 1934. J. G. SWAIN 1,948,320
WHEEL ASSEMBLY
Filed Jan. 11, 1933   3 Sheets-Sheet 3
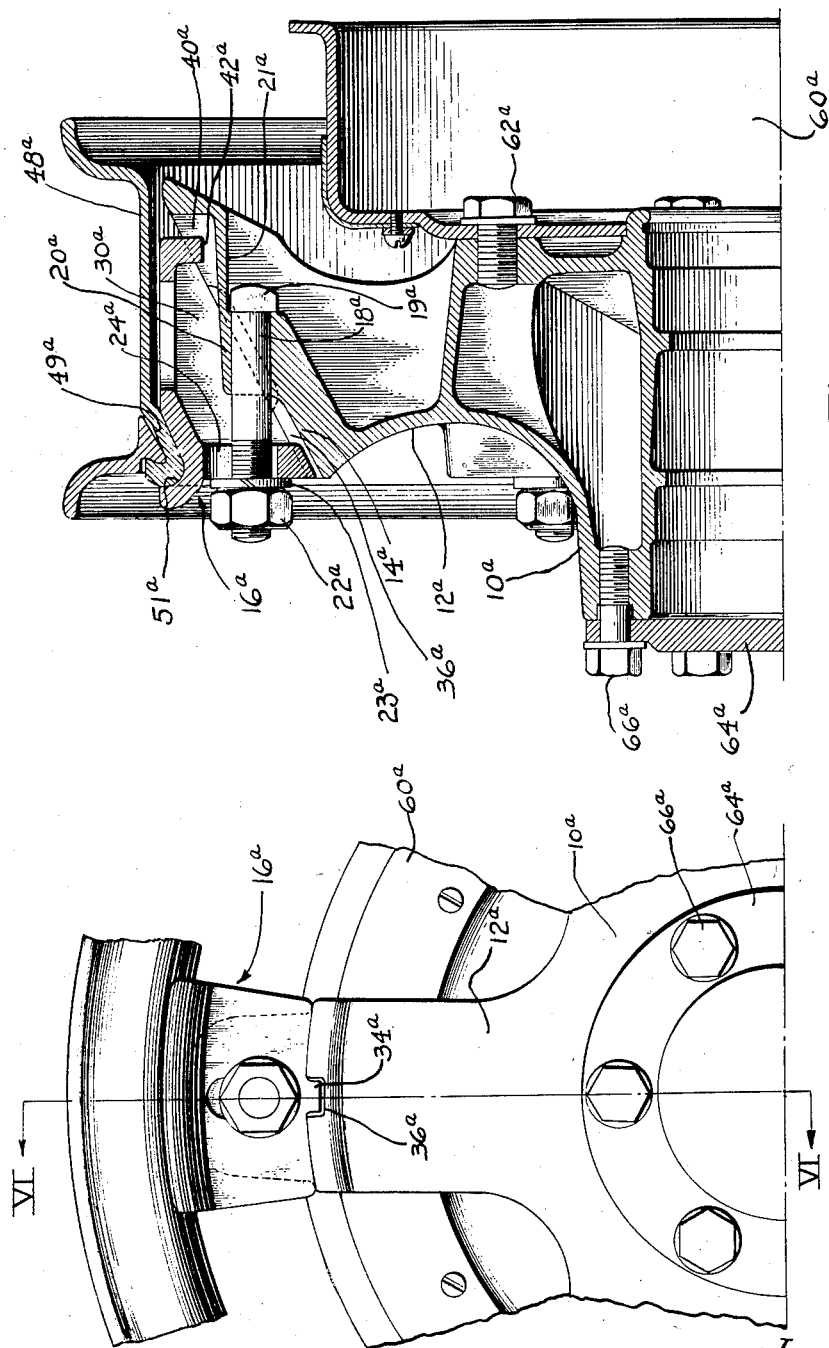

Patented Feb. 20, 1934

1,948,320

UNITED STATES PATENT OFFICE 1,948,320

WHEEL ASSEMBLY

Joseph G. Swain, Akron, Ohio, assignor to Wingfoot Corporation, Wilmington, Del., a corporation of Delaware Application January 11, 1933. Serial No. 651,140

10 Claims. (Cl. 301—13)

The present invention relates to wheel assemblies and is more particularly concerned with providing an improved and simplified demountable rim wheel unit.

It is an object of the present invention to provide a commercially and mechanically practical wheel assembly which permits the mounting of single or dual rims.

Another object of the invention is to provide a wheel assembly in which a single rim or a pair of rims are secured directly upon a felloeless spoked wheel by clamping means which will accommodate different dimensioned rims.

Another object of the invention is to provide a dual rim wheel in which one of the rims is mounted upon a beveled seat formed by the ends of the spokes of the wheel spider with the other rim being mounted upon a clamp which functions both to support the last named rim and to clamp the first named rim upon its beveled seat.

Another object of the invention is to provide a wheel assembly having a minimum of parts, said parts being of a strong and practical construction readily permitting their economical commercial manufacture.

The foregoing and other objects of the invention are achieved by the wheel assembly illustrated in the accompanying drawings, in which:

Fig. 2 is an enlarged side elevation of a fragment of the wheel assembly illustrated in Fig. 1, showing somewhat more clearly the details of the spoke end mounting;

Fig. 3 is a cross-sectional view taken on line III—III of Fig. 2;

Fig. 4 is a cross-sectional view taken on line IV—IV of Fig. 3;

Fig. 6 is a view similar to Fig. 2 illustrating an enlarged fragmentary portion in side elevation of a modified wheel construction adapted to mount a single rim; and Fig. 7 is a view taken on line VI—VI of Fig. 6.

Figure 1:
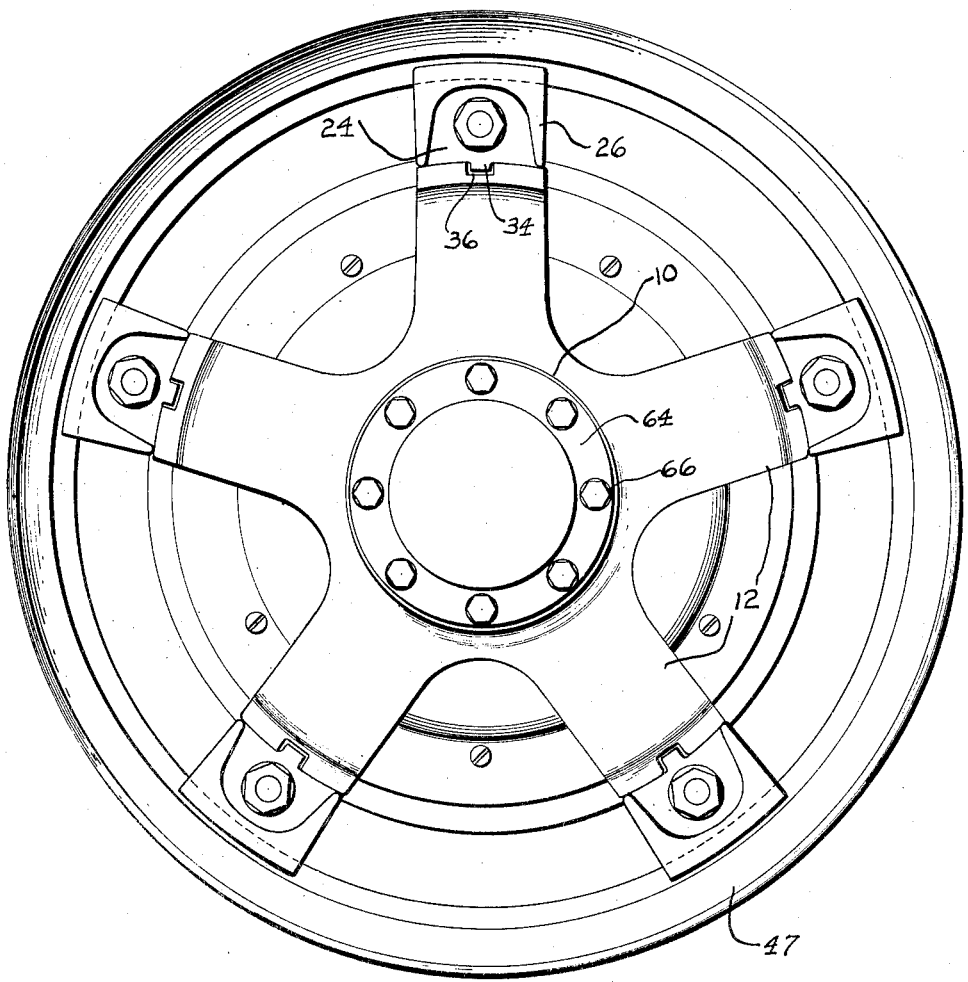
Fig. 1 is a side elevation of one preferred form of the wheel assembly embodying the invention.

Referring to the drawings the numeral 10 indicates generally a wheel member which is formed with a plurality of radial arms or spokes 12 which are preferably cast integral with the hub portion of the wheel member and which may be formed as shown best in Fig. 3. The ends of the spokes are made with axially inclined seats 14 which seats may be formed with side recesses 15.

Cooperating with each inclined seat 14 is a clamp indicated generally by the numeral 16. Each clamp is moved upon its seat 14 by suitable means such as a screw or stud 18 threaded at one end into an enlarged boss 20 formed centrally of each seat 14. The other end of each stud 18 is threaded to receive a nut 22 which engages a radially extending portion 24 of the clamp 16, which portion may be strengthened by suitable side webs 26.

As will be seen from Figs. 2 and 3, the clamp 16 is also formed with sidewalls or flanges 30 which are beveled or inclined to cooperate with the seat 14 and which form a sliding bearing for the clamp 16 upon the seat 14. In addition, these side flanges 30 provide strengthening webs which extend back to the rear portion 32 of the clamp 16. In order to prevent any lateral play or twisting of the clamp 16 suitable rabbeting means may be provided between the clamp and the seat 14. For example, the radial portion 24 of the clamp 16 may be provided with a tongue 34 which is received in a recess 36 formed in the lower portion of the beveled seat 14. In addition, the upper or rear portion of the inclined seat 14 can be formed with a recess 40 which receives a lug or tongue 42 formed as an extension of the rear portion 32 of the clamp 16. The numerals 46 and 47 indicate the rims which are to be mounted on the wheel assembly, it being understood that any type rims having a single beveled seating surface, such as those indicated at 50 and 51, formed on their inner periphery, can be readily employed in the assembly. As shown in Fig. 3 the rim 46 is positioned upon the inclined seat 14 so that the beveled seat 50 of the rim has a sliding clamping fit upon the upper portion of the beveled seat 14. The rear portion of the clamp 16 is formed with a curved or recessed portion 54 adapted to fit around, under and against the shoulder-like extremity of the beveled seat 50 upon the rim 46. Thus when the clamps 16 are moved inwardly upon the beveled seats 14 the rim 46 will be forced up on the inclined seats 14 and will be held in a firmly clamped position.

As illustrated in Fig. 3 the rim 47 is mounted upon the clamps 16 by providing a curved recess 58 in the overhanging portion of each clamp to receive the beveled seat 51 of the rim 47. Thus when the clamps 16 are moved inwardly upon the inclined seats 14 formed on the ends of the spokes 12 the clamps 16 will also move outwardly to firmly hold the rim 47 in position.

It is believed that the operation of the wheel assembly will be completely evident from the foregoing description. However, suffice it to say that when it is desired to demount the rims from the position shown in Fig. 3 the nuts 22 are run off from the bolts 18 which will, of course, permit the removal of clamps 16 to release the rim 47 and allow the rim 46 to be moved laterally off the inclined seats 14 formed on the spoke ends.

By the present construction a wheel assembly is obtained in which the rims are tightly held in position while the assembly is in use and yet the demounting of the rims from the wheel is an easy and facile operation. When in use the rims are held in excellent alignment with the plane of the wheel and there is no tilting or twisting of the clamps due to using rims of slightly different dimensions.

The drawings illustrate a brake drum 60 secured by suitable means such as cap screws 62 to the wheel member 10. A cover plate 64, secured in place by screws 66, has also been shown covering the hub portion of the wheel member 10. However, it will be evident that these incidental parts can be omitted or changed as the occasion demands.

Figure 5:
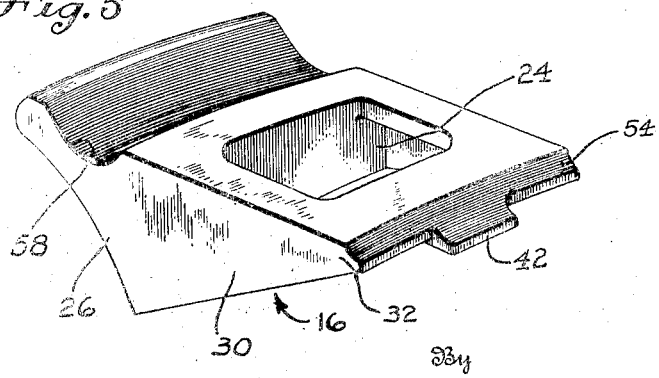
Fig. 5 is a perspective view of the clamp comprising a part of the invention.

The present invention also contemplates mounting a single rim directly upon the felloeless spoked wheel and this form of the invention has been illustrated in Figs. 5 and 6. Referring to these figures, the numeral 10$^a$ indicates a wheel member of a character similar to that illustrated in Figs. 1 to 4 of the drawings, which member is formed with spokes 12$^a$ in turn formed with inclined seats 14$^a$ at their outer extremities in a manner similar to the wheel spider shown in the dual wheel mounting. As a matter of fact the spiders can be made interchangeable as will be evident. The clamps employed in the single rim mounting preferably take a somewhat different form than the clamps in the dual rim mounting and the numerals 16$^a$ indicate generally the single rim clamps. These clamps are formed with a beveled or inclined inner surface which is adapted to slidably cooperate with the inclined seat 14$^a$ of the wheel spider. The clamps 16$^a$ are ordinarily made with inclined side flanges or walls 30$^a$ and with a radially extending portion 24$^a$.

Suitable means are provided for moving the clamps 16$^a$ up on the inclined seats 14$^a$, which means may take the form of a bolt 18$^a$ having a square head 19$^a$. The bolt 18$^a$ is received in an enlarged boss 20$^a$ which is provided with a laterally or rearwardly extending portion 21$^a$ which cooperates with a flattened portion of the head 19$^a$ to prevent the bolt 18$^a$ from revolving as will be understood. A nut 22$^a$, and if desired a lock washer 23$^a$, are received upon the bolt 18$^a$ and serve to control the position of the clamp 16$^a$.

In a manner similar to that referred to with respect to the dual rim mounting, suitable means which slidably interlock the clamps 16$^a$ and inclined seats 14$^a$ may be provided such as a tongue 34$^a$ upon the radial flange 24$^a$ of the clamp 16$^a$, which tongue is received in a suitable cooperating groove or recess 36$^a$ in the lower portion of the inclined seat 14$^a$. The back or upper end of the clamp 16$^a$ may be provided with a tongue or lug 42$^a$ which is received in a recess 40$^a$ in the upper portion of the inclined seat 14$^a$.

Any standard rim of substantially any character can be mounted on the single wheel assembly. However, the beveled type of rim, such as that indicated by the numeral 48$^a$ in Fig. 6, is preferable, in that it has an inclined or beveled seating portion 49$^a$. The clamps 16$^a$ are formed with a suitably curved recess or groove 51$^a$ which is adapted to receive the beveled seat 49$^a$ of the rim 48$^a$ as shown in Fig. 6.

The wheel assembly is adapted to receive any desired type of brake drums such as those shown in 60$^a$ in the drawings, which are secured to the wheel member 10$^a$ by suitable means such as cap screws 62$^a$. A cover plate 64$^a$ secured in position by screws 66$^a$ may be employed to cover the hub of the wheel member 10$^a$. The various features of these incidental elements in the assembly can, of course, be widely varied to suit the individual demands.

While the invention preferably includes a felloeless spoked wheel as part of the assembly, it is appreciated that many of the features of the invention are retained when a felloe type wheel is employed and accordingly the use of a felloe wheel is contemplated. Again the wheel assembly has been described as mounting rims having a single bevel seat. However, it will be understood that other types of rims can be employed with a modification of the mountings whereby the same can be handled.

From the foregoing description it will be evident that a wheel assembly has been provided in which the necessary parts have been reduced to the smallest possible number. The construction of the various parts is such that they can be easily made commercially by production methods. The assemblies can be employed to mount either a single rim or a pair of rims by merely changing the mounting clamps.

It will be appreciated that the best known embodiments of the invention have been illustrated and described in detail and that the invention contemplates such changes in structural details and features as may occur to the ordinary wheel engineer providing an assembly particularly adapted for a specified use. Accordingly the scope of the invention is not limited to the examples thereof disclosed but is defined broadly by the appended claims.

What is claimed is:

1. A wheel assembly including a felloeless, spoked wheel member, the spokes of said wheel member being formed with axially inclined seats, a pair of rims having beveled inner seating surfaces, one of said rims being seated on portions of the seats at the ends of the spokes, a plurality of clamping members respectively associated with the ends of the spokes and having sliding contact with portions of the inclined seats, said clamping members being suitably recessed to form the sole support of the other rim, and means for moving the clamping members up the inclined seats on the spoke ends to simultaneously clamp both rims in position.

2. A wheel assembly including a felloeless, spoked wheel member, the spokes of said wheel member being formed with axially inclined seats, a pair of rims having beveled inner seating surfaces, one of said rims being seated on portions of the seats at the ends of the spokes, a plurality of clamping members respectively associated with the ends of the spokes and having sliding contact with portions of the inclined seats, said clamping members being suitably recessed to form the sole support of the other rim, means for moving the clamping members up the inclined seats on the spoke ends to simultaneously clamp both rims in position, and means for holding the clamping members against twisting movement on the spoke ends.

3. In combination, a wheel hub having spokes extending therefrom, all of said spokes being formed with axially inclined seats at their ends, a rim mounted on the inclined seats, a plurality of clamping members for forcing the rim on the seats, a second rim, said clamping means also serving to clamp and support the second rim in spaced relation with the first, said second rim being received and held solely in suitable recesses in the clamping means.

4. In combination, a wheel hub having spokes extending therefrom, all of said spokes being formed with axially inclined seats at their ends, a demountable tire rim mounted on the inclined seats, a plurality of axially adjustable wedge blocks for forcing the rim on the seats, and a second rim, said wedge blocks also serving to clamp and solely to support the second rim in spaced relation with the first.

5. In combination, a wheel hub having spokes extending therefrom, all of said spokes being formed with axially inclined seats at their ends, a demountable tire rim mounted on the inclined seats, a plurality of axially adjustable wedge blocks for forcing the rim on the seats, a second rim, said wedge blocks also serving to clamp and solely to support the second rim in spaced relation with the first, said second rim being received and held in suitable recesses in the wedge blocks, and means for holding the clamping means against twisting on the spokes.

6. A wheel assembly including a hub having outwardly extending spokes, axially inclined seats on the ends of all of said spokes, beveled clamps on portions of each of said seats, means for axially adjusting the clamps on the seats, said seats and said clamps being independently adapted to support demountable tire rims, a rim supported solely on said clamps, and a second rim held on said seats by the clamps.

7. In combination, a hub member, spokes extending outwardly from the hub member, axially inclined seats on the ends of said spokes, beveled clamps adapted to cooperate with the inclined seats, said clamps being formed with spaced apart inclined sides providing a sliding bearing for the clamps, bolt means fastened to the seats and extending axially between the sides of the clamps, a radial flange on the clamps through which the bolt means extend, a tongue and groove sliding connection being provided between the clamps and the spoke seats, a rim having a beveled portion, said rim being supported on the upper portion of the inclined seats on the spokes, said clamps contacting the side of said rim to force it on the seats, and a second rim having a beveled portion mounted and supported directly by the clamps in suitably recessed portions thereof.

8. In combination, a hub member, spokes extending outwardly from the hub member, axially inclined seats on the ends of said spokes, beveled clamps adapted to cooperate with the inclined seats, said clamps being formed with spaced apart inclined sides providing a sliding bearing for the clamps, bolt means fastened to the seats and extending axially between the sides of the clamps, a radial flange on the clamps through which the bolt means extend, a rim having a beveled portion mounted and supported on the upper portion of the inclined seats on the spokes, said clamps contacting the side of said rim to force it on the seats, and a second rim having a beveled portion mounted and supported directly by the clamps.

9. In combination, a hub member, spokes extending outwardly from the hub member, axially inclined seats on the ends of said spokes, beveled clamps adapted to cooperate with the inclined seats, bolt means fastened to the seats, a radial flange on the clamps through which the bolt means extend, a rim having a beveled portion mounted and supported on the upper portion of the inclined seats on the spokes, said clamps contacting the side of said rim to force it on the seats, and a second rim having a beveled portion mounted and supported directly by the clamps in suitably recessed portions thereof.

10. In combination, a hub member, spokes extending outwardly from the hub member, axially inclined seats on the ends of said spokes, beveled clamps adapted to cooperate with the inclined seats, said clamps being formed with spaced apart inclined sides providing a sliding bearing for the clamps, bolt means fastened to the seats and extending axially between the sides of the clamps, a radial flange on the clamps through which the bolt means extend, a rim mounted and supported on the upper portion of the inclined seats on the spokes, said clamps contacting the side of said rim to force it on the seats, and a second rim mounted and supported directly by the clamps in suitably recessed portions thereof.

JOSEPH G. SWAIN.